(12) United States Patent
Karlsson

(10) Patent No.: US 6,408,815 B2
(45) Date of Patent: Jun. 25, 2002

(54) INTERNAL COMBUSTION ENGINE INSTALLATION IN A MOTOR VEHICLE

(75) Inventor: Jan Karlsson, Västra Frölunda (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 09/681,701

(22) Filed: May 23, 2001

(30) Foreign Application Priority Data

May 23, 2000 (SE) ................................. 0001920

(51) Int. Cl.[7] .............................................. F02M 25/08
(52) U.S. Cl. ................................................... 123/198 R
(58) Field of Search ....................... 123/198 R, 198 E, 123/519; 96/143, 146

(56) References Cited

U.S. PATENT DOCUMENTS 5,912,423 A * 6/1999 Doughty et al. ............. 96/143
6,212,882 B1 * 4/2001 Greger et al. ................ 96/143

* cited by examiner

Primary Examiner—Gene Mancene
Assistant Examiner—Hyder Ali
(74) Attorney, Agent, or Firm—Kilpatrick Stockton LLP

(57) ABSTRACT

Internal combustion engine installation in a motor vehicle, comprising an internal combustion engine, arranged in an engine compartment, with a radiator and a hydrocarbon-absorbent arranged behind the radiator, in the form of a disc. A heating device is heated by air, which is heated by the engine exhaust manifold. The disc is rotatable by a motor and is arranged so in relation to the heating device that a portion of the disc is exposed to the radiator when another portion is heated to evaporate absorbed hydrocarbons and regenerate the hydrocarbon absorbent. Released hydrocarbons are drawn through a conduit from the heating device to the engine intake manifold.

9 Claims, 2 Drawing Sheets

INTERNAL COMBUSTION ENGINE INSTALLATION IN A MOTOR VEHICLE

CROSS REFERENCE TO RELATED APPLICATIONS

This application claims priority to Swedish Application No. 0001 920-8, filed May 23 2000.

BACKGROUND OF INVENTION

1. Technical Field

The present invention relates to an internal combustion engine installation in a motor vehicle. More specifically, the present invention relates to an internal combustion engine arranged in an engine compartment, with the engine having an intake air conduit that opens to an intake manifold, and an exhaust manifold that opens to an exhaust conduit.

2. Background Information

The development of new engines for vehicles has been directed for quite some time to increasing the engine efficiency in order to, inter alia, reduce the amount of exhaust and its damaging effects to the environment. Catalytic converters are typically used to reduce the percentage of damaging substances in vehicle exhaust. It is also known to use a hydrocarbon absorbent, e.g., a zeolite, between the exhaust manifold and the catalytic converter to take care of the hydrocarbons before the catalytic converter has become sufficiently hot. Also, combined electric and internal combustion engines, called hybrid engines, have come into commercial use as a means for reducing the amount of exhaust released from engines.

Lately, however, methods have been developed to clean the air already polluted by other vehicles, including breaking down toxic ozone found close to the ground. This ozone is formed by photosynthesis of hydrocarbons and nitrogen oxides, i.e., the smog formed when these substances from vehicle exhaust are subjected to sunlight. In a known method, a catalytic coating is sprayed onto the radiator flanges and pipes of the vehicle. When the ozone comes in contact with the heated catalytic converter coating, it is transformed into oxygen.

SUMMARY OF INVENTION

The present invention intends to achieve an engine installation which makes it possible to remove additional toxic substances in ambient air, such as existing hydrocarbons from the exhaust of other vehicles.

This is achieved according to the invention by arranging a hydrocarbon-absorbing element and a heating device relative to each other in an engine compartment so that a portion of the hydrocarbon-absorbing element is exposed to the surrounding engine compartment when another portion of the element is exposed to the heating device. In such manner, by heating the portion of the hydrocarbon-absorbing element with the heating device, hydrocarbons from ambient air that are absorbed by the hydrocarbon-absorbing element are removed from the element. The hydrocarbon-absorbing element is movable in such manner that a portion of the element is able to move to the heating device at the same time as another portion moves away from the heating device.

The hydrocarbon-absorbing device can be a zeolite with a honeycomb structure, or an active carbon filter that absorbs hydrocarbons in ambient air. After a certain time, such a device becomes saturated with hydrocarbons and needs to be regenerated, i.e., have the absorbed hydrocarbons removed. This is done by heating the device, thereby enabling the hydrocarbons to be desorbed. Once desorbed, they are sucked into the engine combustion chambers and combusted. The hydrocarbon-absorbing element can be a disc that is rotatable by the engine. The disc may be rotated stepwise after a certain time period, e.g., every ten minutes, so that a new sector of the disc is rotated into the heating device and regenerated while the rest of the disc is exposed to ambient air flowing into the engine compartment.

BRIEF DESCRIPTION OF DRAWINGS

The invention will be described in more detail below with reference to examples shown in the accompanying drawings, wherein.

DETAILED DESCRIPTION

Figure 1:
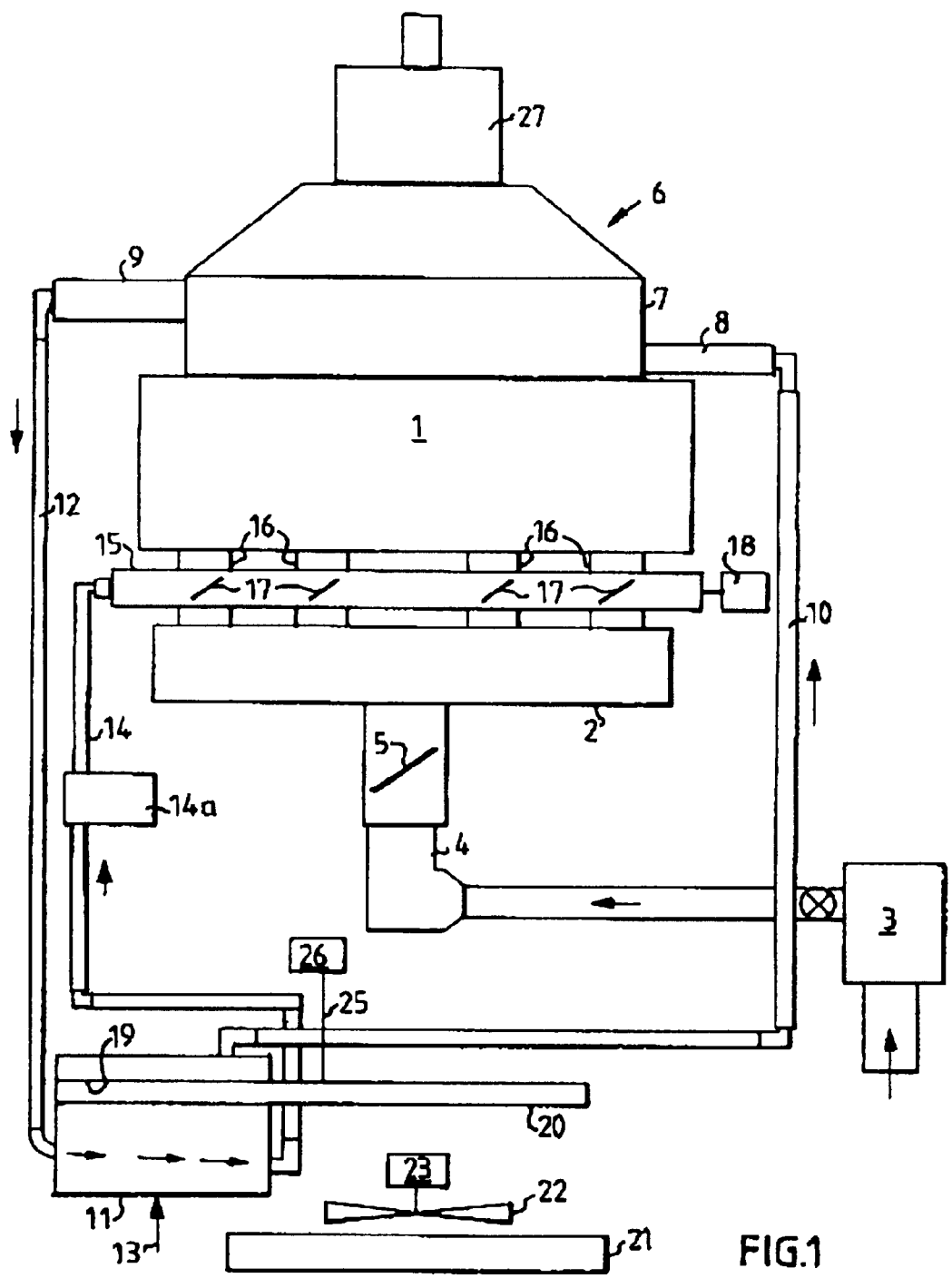
FIG. 1 is a schematic representation of a first embodiment of an engine installation-according to the present invention.

In FIG. 1, 1 designates a four-cylinder internal combustion engine with an intake manifold 2, an air intake filter 3 and an air intake conduit 4,. having a throttle 5. While a four-cylinder engine is illustrated, it should be understood that the present invention is applicable to engines of various cylinder configurations. An exhaust manifold 6 has exhaust manifold conduits (not shown) surrounded by an outer cover 7, which has an inlet 8 and an outlet 9 for air. The exhaust manifold 6 opens into a catalytic converter 27. The inlet 8 communicates via a conduit 10 with one side of a heat exchangers 11, while the outlet 9 communicates with the other side of the heat exchanger 11 via a conduit 12. Cold ambient air is sucked into the heat exchanger 11 at the arrow 13 and flows via the conduit 10 to a space defined between the outsides of the exhaust manifold pipes and the cover 7. The air heated by the exhaust manifold 6 flows to the heat exchanger 11, which in turn is heated. The air continues through an outlet conduit 14 having an air filter 14a to a pipe 15 that communicates with the inlets of each branch pipe 16 of the intake manifold 2. In each inlet there is a throttle 17 that is controlled by a step motor 18 for controlling the flow of heated air to the combustion chambers of the engine 1.

The heat exchanger 11 is a two-part heat exchanger 11 with a gap 19 between the parts. The gap 19 has a width corresponding to the width of a circular disc-shaped porous element 20. The element 20 is one that can absorb hydrocarbons, e.g., a zeolite or an active carbon filter. As illustrated, the heat exchanger 11 may be placed behind (or alternatively in front of) and to one side of the engine radiator 21 in the engine compartment so that a major portion of the element 20 outside the heat exchanger is exposed to the radiator 21. Between the radiator 21 and the element 20 there is an engine cooling fan 22 with its motor 23.

The element 20 is fixed on a shaft 25 of a step motor 26, which turns the element 20 a certain angle after a certain period, e.g., one quarter turn every ten minutes. In this example, the heat exchanger is. dimensioned so that it heats a fourth of the element 20 at a time. Instead of a rotating disc 20, a number of plates fixed to a chain conveyor may be used. The plates move past the radiator and are preferably dimensioned so that they overlap the entire surface of the radiator.

The segment of the element 20 in the heat exchanger gap 19 is heated by the heat exchanger 11. The exchanger 11 operates at a temperature of about 150° C., which is needed to desorb those hydrocarbons absorbed by the element 20 from air flowing through the radiator 21. The desorbed hydrocarbons are then brought by air flowing through the conduit 14 into the intake manifold 2 of the engine.

Figure 2:
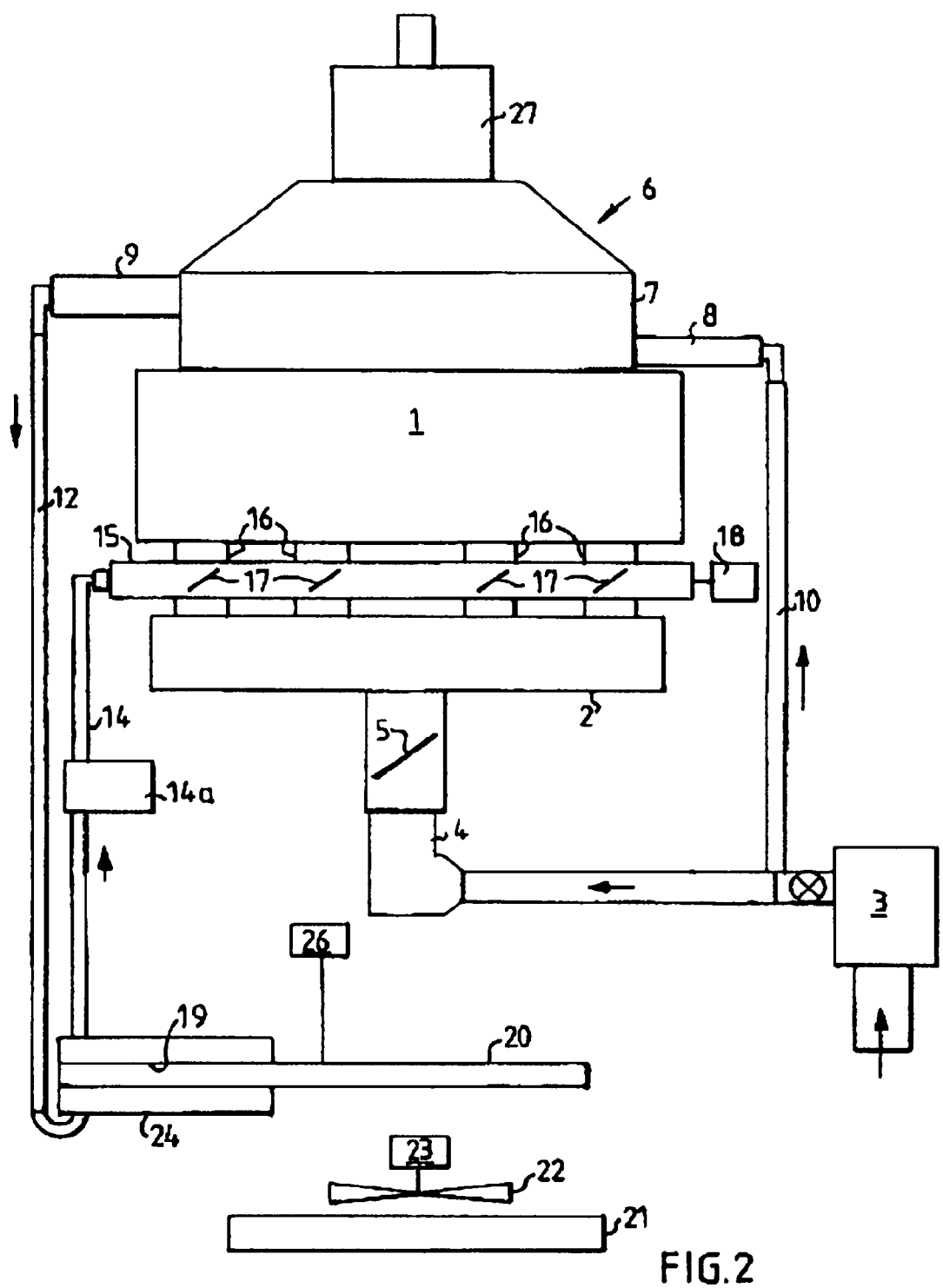
FIG. 2 is a corresponding schematic representation of a second embodiment of an engine installation according to the present invention.

The embodiment in FIG. 2 differs from that described above in that the heat exchanger 11 has been replaced by a heating device 24. In this embodiment, air heated by the exhaust manifold 6 flows directly into the engine intake manifold 2. This is in contrast to the heat exchanger 11 of FIG. 1, wherein air flowing in at the arrow 13 is conducted twice through the heat exchanger 11 before being conducted into the engine 1. Instead, in the embodiment of FIG. 2, the inlet conduit 10 is connected to the engine intake conduit 4 directly after the air filter 3.

The regeneration of the hydrocarbon-absorbing device 20 takes place at low load. This is the predominant operating state for common passenger cars with subatmospheric pressure in the intake pipe downstream of the throttle 5. At high load (acceleration), the throttles 17 are closed by the step motor 18 to prevent poorer response due to mixing heated air with the intake air. By arranging a pipe 15 with separate throttles 17 to each of the intake branch conduits 16, the supply of heated air can be rapidly throttled while limiting the heating of adjacent portions of the engine. In an alternative embodiment, the throttles can be individually controllable, for example, to utilize the suction pulses in the various intake pipes 16.

Tests have shown that merely supply of hot air to the intake air in the manner described at low load can reduce fuel consumption by approximately 3%. By supplying hydrocarbons from regeneration of the hydrocarbon absorbent to the intake air, additional energy is provided in the order of about 0.05. to about 0.1%.

As described above, the hydrocarbon absorbent is heated by air which, in turn, has been heated by the exhaust, i.e., the heating is done indirectly by the exhaust. However, it is also possible within the scope of the invention to use the exhaust for direct heating and transport of evaporated hydrocarbons to the intake manifold of the engine, a type of EGR.

An internal combustion engine installation and its components have been described herein. These and other variations, which will be appreciated by those skilled in the art, are within the intended scope of this invention as claimed below. As previously stated, detailed embodiments of the present invention are discussed herein. However, it is to be understood that the disclosed embodiments are merely exemplary of the invention that may be embodied in various forms.

What is claimed is:

1. An internal combustion engine installation in a motor vehicle having an internal combustion engine arranged in an engine compartment, said engine having an air intake conduit that opens to an intake manifold, and an exhaust manifold which opens to an exhaust conduit, comprising:
    a hydrocarbon-absorbing element, and
    a heating device for heating and removal of hydrocarbon from said hydrocarbon-absorbing element,
        wherein said heating device is an element heated by the engine exhaust,
        wherein said hydrocarbon-absorbing element of said heating device are so arranged in said engine compartment relative to each other that a portion of said hydrocarbon-absorbing element is exposed to the surrounding engine compartment when another portion of said element is exposed to said heating device, and
        wherein said hydrocarbon-absorbing element is movable such that a portion of said element moves to said heating device at the same time as another portion moves away from said heating device.

2. The engine installation according to claim 1 wherein the exhaust manifold forms heating elements in a container through which ambient air flows, said container communicating with an inlet to said heating device, and wherein said heating device has an outlet for communicating with said intake manifold.

3. The engine installation according to claim 1 wherein said heating device has an inlet to each branch conduit of said intake manifold downstream of a throttle of said intake conduit, and wherein each said inlet from the heating device contains a throttle for controlling air supply from the heating device.

4. The engine installation according to claim 1 wherein said hydrocarbon-absorbing element has a portion exposed to a radiator in said engine compartment and another exposed to said heating device.

5. The engine installation according to claim 1 wherein said hydrocarbon-absorbing element is a disc element rotatable by a motor.

6. An internal combustion engine arrangement having an air intake conduit and an exhaust manifold in an engine compartment comprising:
    a hydrocarbon-absorbing element, and
    a heating device for heating and removal of hydrocarbon from said hydrocarbon-absorbing element,
        wherein said hydrocarbon-absorbing element of said heating device is so arranged in said engine compartment relative to each other that a portion of said hydrocarbon-absorbing element is exposed to said heating device, and
        wherein said hydrocarbon-absorbing element has a portion exposed to a radiator in said engine compartment and another portion exposed to said heating device.

7. The internal combustion engine arrangement of claim 6 wherein said hydrocarbon-absorbing element is movable such that a portion of said element moves to said heating device at the same time as another portion moves away from said heating device.

8. The internal combustion engine arrangement of claim 6 wherein said heating device is heated by air heated by said exhaust manifold.

9. An internal combustion engine installation in a motor vehicle having an internal combustion engine arranged in an engine compartment, said engine having an air intake conduit that opens to an intake manifold, and an exhaust manifold which opens to an exhaust conduit, comprising:
    a hydrocarbon-absorbing element, and
    a heating device for heating and removal of hydrocarbon from said hydrocarbon-absorbing element,
        wherein said hydrocarbon-absorbing element of said heating device are so arranged in said engine compartment relative to each other that a portion of said hydrocarbon-absorbing element is exposed to the surrounding engine compartment when another portion of said element is exposed to said heating device, and
        wherein said hydrocarbon-absorbing element is movable such that a portion of said element moves to said heating device at the same time as another portion moves away from said heating device,
        said heating device and said hydrocarbon-absorbing device being arranged in relation to one another to enable continuous absorbing and desorbing of the hydrocarbons.

* * * * *